Dec. 18, 1928.
T. SCHOU
1,695,391
SQUIRREL CAGE WINDING
Filed July 14, 1920
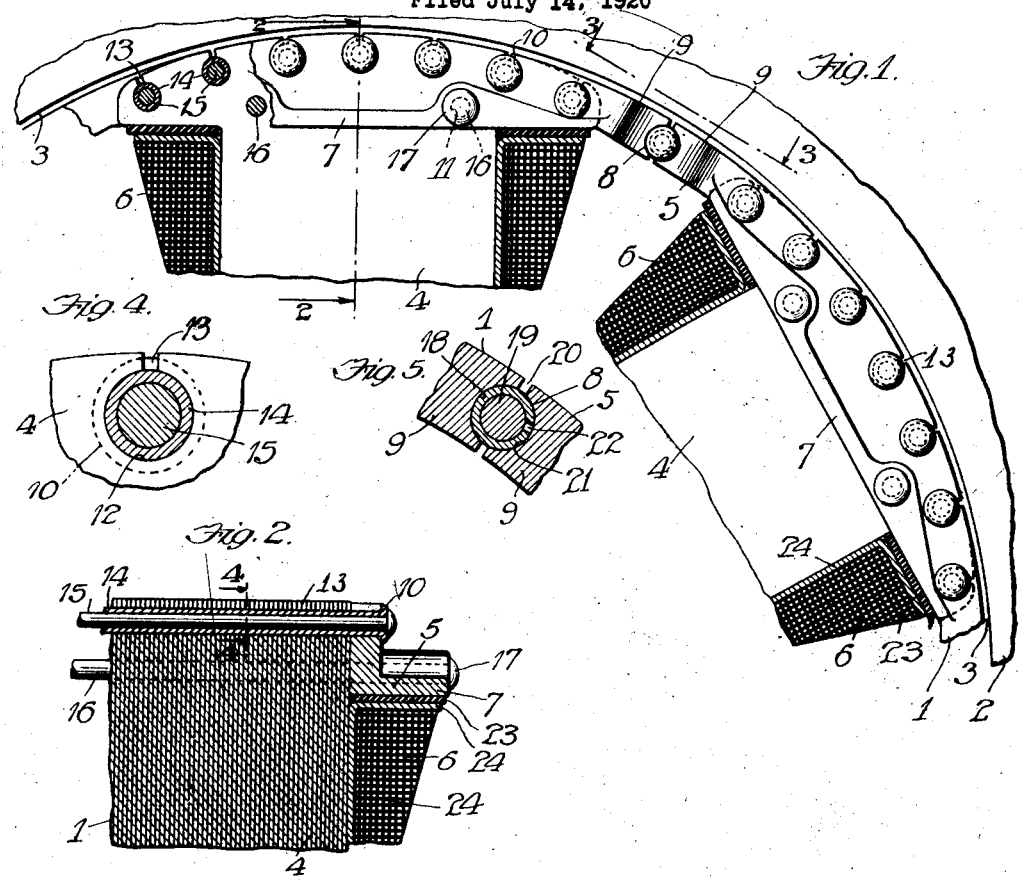
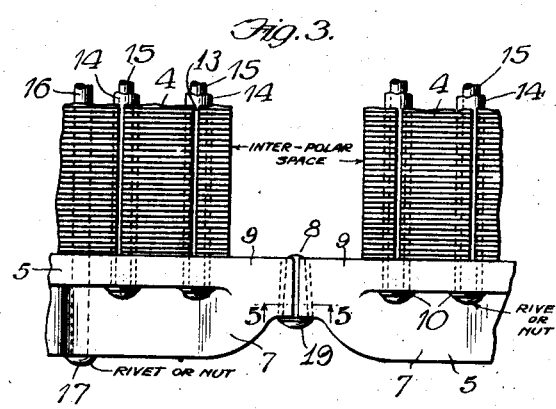
Witnesses:
Martin H. Olsen
Fred M. Davis
Inventor:
Theodor Schou
By Rummler & Rummler
Attys Patented Dec. 18, 1928.

1,695,391

UNITED STATES PATENT OFFICE.

THEODOR SCHOU, OF MANSFIELD, OHIO, ASSIGNOR TO IDEAL ELECTRIC & MANUFACTURING COMPANY, OF MANSFIELD, OHIO, A CORPORATION OF OHIO.

SQUIRREL-CAGE WINDING.

Application filed July 14, 1920. Serial No. 396,250.

This invention relates to dynamo-electric machines and more particularly to self-starting synchronous alternating current motors having squirrel cage means to assist in starting.

Heretofore squirrel cage windings of various kinds have been used in such motors, but so far as I am aware the squirrel cage has consisted merely of plain solid bars imbedded in slots in the pole faces and connected to plain end rings, or end ring segments, with no suggestion of the improvements hereinafter set forth and claimed.

The main objects of this invention are to provide an improved form of end ring adapted to serve also as a coil support in high speed machines; to provide an improved form of squirrel cage winding having novel structural features adapted to facilitate more efficient standardization and economy in manufacture, and adapted to accommodate extensive variations in design for different current capacities and purposes with a minimum number if sizes, gages and parts; to provide improved means for varying and adjusting the magnetic reluctance, or rotor reactance; to provide an improved form of squirrel cage bar conductor adapted for manufacture in a numerous variety of capacities with a common external end gage, and in a style adapted for interchangeability in accordance with the resistance, reluctance and current capacity required in any motor, in combination with a standard size and form of end ring; to provide such a conductor adapted for ready adjustment of its current capacity and other essential characteristics, either before or after connection to the end rings; to provide an improved method and simplified means for mutually connecting the parts of a segmental end ring applicable after assembling the ring members on the core; to provide improved means for securing the sections of a segmental squirrel cage ring to the core in a manner adapted to prevent displacement by centrifugal force, and to serve also as a seat for the adjacent parts of the field coils at their outer ends, and to more effectually combine economical manufacturing features with flexibility of design.

An illustrative embodiment of this invention is shown by the accompanying drawings, in which—

Fig. 1 is mainly a side view of a segment of the outer part of a rotary field member, showing two pole-pieces and squirrel cage means thereon, parts of the view being in section.

Fig. 2 is a fragmentary section in an axial plane at 2—2 on Fig. 1.

Fig. 3 is a fragmentary view of the outer face of a part of one of the squirrel cage end rings and adjacent parts as viewed at 3—3 on Fig. 1.

Fig. 4 is an enlarged section at 4—4 on Fig. 2.

Fig. 5 is an enlarged section at 5—5 on Fig. 3.

Fig. 6 shows in cross-section a multitubular conductor.

In the construction shown in the drawings, the rotor 1 including the field members is surrounded by the stator 2 with an air gap 3 between their faces. The said rotor includes a series of pole-pieces 4, as understood in the art, the outer ends of which are provided with and mechanically connected by a squirrel cage winding 5. Inwardly disposed from said squirrel cage winding on each pole-piece is a magnetizing coil 6, the outer end of which is seated against a bracket-like member 7 formed integrally with the end rings of the squirrel cage structure. Means are provided midway between the outer ends of the poles, as shown at 8, for electrically connecting the adjacent ends of the end ring segments 9.

The ends of the squirrel cage conductors are riveted in place as shown at 10. The pole-pieces are provided with perforations as shown at 11 and 12. The squirrel cage conductors proper are mounted in the holes 12 which on their outer side are open, as shown at 13. Each of these conductors is of compound character and comprises a highly conductive tubular part 14 and a magnetic core part 15. Each of the holes 11 is provided with a steel bolt or rivet 16 extending through the brackets 7, the outer ends being secured either by a nut or by riveting, as shown at 17.

The connection shown at 8 for the end ring segments includes a split sleeve 18 of current-conducting material and a wedging core 19, preferably also of good conducting material. The ends of the segments 9 are separated slightly by a gap, as shown at 20. The inner faces of the aperture 21 for sleeve 18 are reamed to receive a tapered form of sleeve and plug 19, so that when the latter is driven into place, the sleeve is expanded tightly against the conical faces of the aperture 21, such expansion being provided for by the split side shown at 22. This provides a very secure electrical and mechanical connection which when required may be readily disconnected.

Insulation for the inner face of the squirrel cage bracket 7 is provided at 23 to supplement the regular field insulation 24.

A modified form of squirrel cage conductor is shown in Fig. 6, where the tubular member is of composite character, including a plurality of concentric tubes 25 and 26, of copper or brass, surrounding the steel bolt 27.

It is to be noted that the above-described form of squirrel cage winding has very marked advantages both as to mechanical construction and electrical operation. By using tubular instead of solid bars it is possible to obtain various resistances of the bars merely by varying the inside diameter of the tube and thereby varying the thickness of the tube walls and without varying the outside diameter of the tubes, and so preventing the necessity of changing the size of slot to be punched in the rotor laminations. The conductivity of the bars, that is to say, their current capacity, may be varied either by selecting tubes of different wall thickness, or by combining a plurality of concentrically disposed relatively thin tubes.

In the case of synchronous motors, it is often desirable to start and pull into synchronism with a rather heavy load. Under running conditions, the squirrel cage winding is not effective except for eliminating "hunting" or fluctuation due to current and voltage supply. As the starting conditions vary over a large range depending upon what the synchronous motor is driving, it will be readily understood that the design of the squirrel cage or starting winding will vary considerably both as to material and distribution thereof in different cases.

Manifestly, it is very desirable to achieve various starting characteristics with standard parts adapted to be formed with the same dies, so far as standard economical manufacture is concerned, reference being had particularly to the slot dies necessary for punching the holes in the pole laminations for imbedding the squirrel cage winding. When solid bars are used, it is possible to increase or reduce the resistance of the squirrel cage winding both by changing the material and the cross-section of the bar, but it will be understood that from a manufacturing standpoint, this is undesirable because of the great variety of parts necessary to be carried in stock. I have simplified methods and means for accomplishing this purpose by making the magnetic parts of standard form and size for a large variety of motor designs, and accommodating the design of the squirrel cage winding itself to the specific needs, rather than in selecting different core designs. It is apparent that this is accomplished by using tubing, the outer diameter of which is the same in all cases for a given range of requirements, but the thickness of the tube wall may vary over a large range, thus varying the resistance of the conductor used accordingly.

By inserting a solid bar of magnetic material through the tube, I not only further vary the resistance but also vary the reactance or reluctance. Furthermore, in thus using magnetic material I take advantage of the skin effect for pull-in purposes.

At standstill, the frequency of the squirrel cage winding is identical with the line frequency (usually 60 cycles in the U. S.). At such a high frequency the skin effect is very pronounced, that is, at starting very little or no current will go through the inner magnetic conductor, but will be conducted largely through the tube. When the rotor accelerates, the frequency in the squirrel cage winding will decrease in proportion to the gain in speed, and as the speed increases, the skin effect, or fictitious reluctance, will decrease, and near synchronous speed this inner conductor will allow currents to circulate, and thus substantially help during the pull-in period.

Such a winding, therefore, allows good starting torque and good pull-in torque. With good starting torque and pull-in torque it is understood high torque per K. V. A. drawn from line, or, in other words, the starting is accomplished with a minimum current inrush from the line.

The most desirable feature of such a winding, however, is the economical value of such a construction for extensive production of motors of different designs. Although but one complete embodiment and a slight modification of this invention has been herein shown and described, it will be understood that numerous details of the construction shown may be altered or omitted without departing from the spirit of this invention as defined by the following claims.

I claim:

1. A squirrel cage winding including a segmental end connecting ring, the ends of the segments being disposed approximately in abutting relation with a conoidal aperture disposed perpendicularly to the plane of said ring at the joint, in combination with a conducting sleeve having a split side disposed in said aperture and a conoidal wedge fitting tightly within said sleeve to expand the same tightly against said segments.

2. A squirrel cage end ring comprising a series of segments, each of which has a central cross section of substantially L-shape, in combination with a plurality of parallelly disposed bars, part of which serving primarily as conductors, having their ends disposed in and secured to the thin part of the segment and the others, serving mainly as mechanical fastenings, having their ends disposed in and secured to the relatively thick part, constituting the bottom of the L.

3. In a device of the character described, a split end ring, supporting means therefor, and interposed expansive means to electrically connect the ends of said ring, the said expansive means comprising a longitudinally split bushing and a wedge fitting therein.

4. The method of assembling dynamo eletric rotor squirrel cage windings, which consists in associating spaced-apart rings of uniform size and character with laminations having uniform standard openings therein, placing tubular conductors of copper in the uniform standard openings of said laminations adapted to receive the same, the tubular conductors of copper being of uniform diameter to fit such uniform standard openings in said laminations, and inserting steel or iron rods into said copper tubes and securing by means of such rods the end rings and laminations and copper tubes in rigid relation while also electrically connecting the end rings not only by said copper tubes but also by said steel rods, the diameter of the steel rod and the interior diameter of the copper tube being predetermined in accordance with the required need in the electrical design of the machine.

5. The method of assembling dynamo electric rotor squirrel cage windings, which consists in associating spaced-apart end rings with a stack of laminations having registering openings in the peripheral portion thereof, electrically connecting said end rings by means of copper or brass tubes fitting in the openings in said laminations, inserting iron or steel rods through said tubes, and clamping the ends of said rods to said end rings to cause said rods as well as said tubes to electrically connect the end rings and at the same time securely hold the aforesaid parts in rigid relation to form such squirrel cage winding.

Signed at Mansfield, Ohio, this 25th day of June, 1920.

THEODOR SCHOU.